Patented Jan. 26, 1954

2,667,234

UNITED STATES PATENT OFFICE 2,667,234

ACETYLENE SEPARATION PROCESS

Rudolph Leonard Hasche, Johnson City, Tenn., assignor, by mesne assignments, to Koppers Company, Inc., Pittsburgh, Pa., a corporation of Delaware No Drawing. Application February 25, 1950, Serial No. 146,400

3 Claims. (Cl. 183—115)

This invention relates to a process for the separation and recovery of acetylene from a mixture of gases, particularly from gases obtained by high temperature pyrolysis or cracking of hydrocarbons and which, in addition to acetylene, contain ethylene and other gases, including methane, hydrogen, carbon monoxide, and carbon dioxide.

Acetylene may be separated from a mixture of gases containing it, for example, by bringing into contact with the mixture a liquid absorbent medium or "solvent" having a preferential affinity for the gas to be separated. It is especially desirable to bring the gaseous mixture into contact with the liquid absorbent medium under superatmospheric pressure, for example, 300 pounds per square inch, with both the gaseous mixture and the absorbent being at a temperature preferably close to or perhaps considerably below atmospheric temperature. Under these conditions the gas to be separated is absorbed by the liquid absorbent medium and may subsequently be recovered therefrom.

An absorbent to be used in the recovery of acetylene from a gaseous mixture containing ethylene, for example, should preferably have the following properties:

(1) High solubility for acetylene and low solubility for ethylene and other constituents of the mixture;

(2) High boiling point and low vapor pressure at atmospheric temperatures;

(3) Miscibility with water in all proportions;

(4) High stability at temperatures at or near its boiling point;

(5) Low viscosity; and (6) No tendency to react chemically with any constituents of the mixture.

It has been generally assumed that a solvent to be practical for general use should be of low initial cost, but I have found that very little solvent is lost when used in my process; therefore, low cost is, of course, a desirable though not essential requisite in the choice of a suitable solvent for use in this process.

A number of solvents having some, but not all, of the foregoing properties have been used to advantage in processes of separating acetylene from gaseous mixtures which also contain ethylene. Normally, it is found, however, that such solvents have one or more disadvantageous features which limit their efficiency in a process of the type described hereinafter. Although both acetone and acetaldehyde, for example, have high absorptive capacity for acetylene, both have the disadvantage of a low boiling point. The polyglycols, their ethers, esters, and ether-esters have been investigated because of their higher boiling points, but their solubility for acetylene is only about half that of acetone. Lactones have been studied, but only the lower members of the class, which have low boiling points, are good solvents for acetylene. Certain of the nitrogen compounds, such as the alkylamines, are solvents for acetylene, but, as the boiling points of the alkylamines increase, the solvent capacities decrease to a point where the compounds are no longer suitable for the use desired.

It is an object of the present invention to separate acetylene from a mixture of gases containing acetylene and ethylene by a novel process involving the use of a new class of solvents of unique and highly desirable absorbent properties, particularly with respect to solubility and selectivity for acetylene.

I have found that in the separation and recovery of acetylene from a mixture of gases containing acetylene and ethylene the trialkoxyalkyl phosphates are a superior class of compounds to be used as absorbents in my process. More particularly, the trialkoxyalkyl phosphates show a selectivity for acetylene with respect to other components of a gaseous mixture containing acetylene superior to that of other known absorbents. At the same time, the trialkoxyalkyl phosphates have all of the other desirable properties listed above, including high solvent capacity for acetylene.

I have discovered that acetylene may be selectively removed from gaseous mixtures containing the same by contacting such mixtures with the trialkoxyalkyl phosphates, the individual organic radicals of which contain not more than about six carbon atoms.

The trialkoxyalkyl phosphates with which the present invention is concerned comprise esters of orthophosphoric acid and alkoxy alkylols which alkylols contain not more than about six carbon atoms per molecule. These trialkoxyalkyl phosphates may be represented by the following structural formula in which $R_1$ and $R_2$ are alkyl groups and the total number of carbon atoms in $R_1$ plus $R_2$ is not greater than six:

$$(R_1\text{—}O\text{—}R_2)_3PO_4$$

The alkyl groups represented by $R_1$ and $R_2$ may be either the same or different and may vary in the three alkoxyalkyl radicals united with the phosphate group.

Particularly desirable are the orthophosphates of alkoxyethyl alcohol. Trimethoxyethyl phosphate and triethoxyethyl phosphate are preferred.

It is to be understood, however, that all those alkoxy phosphates embraced by the foregoing structural formula the alkoxyalkyl radicals of which contain not more than six carbon atoms can be utilized in the process of this invention.

Thus trimethoxy, triethoxy, normal and isotripropoxy and normal and isotributoxy ethyl phosphates may be employed.

Likewise trimethoxy, triethoxy and normal and isotripropoxy propyl phosphates may be utilized as well as trimethoxy and triethoxy butyl phosphates. Similarly useful are trimethoxy, triethoxy, tripropoxy and tributoxy methyl phosphates. In addition mixed tri-phosphates such as dimethoxy - ethyl - monoethoxy - ethyl phosphate may be employed.

The alkoxy alkylols from which the phosphates of this invention are derived may be prepared by any of the methods known to the art. A particularly desirable method, however, is to effect the reaction of the appropriate alkylene oxide with an alcohol having the desired alkoxy group. Thus methoxy-ethyl alcohol may be prepared by reacting, in known manner, ethylene oxide and methyl alcohol. Similarly ethoxy propyl alcohol may be prepared by reacting propylene oxide and ethyl alcohol. The phosphoric acid esters of the alkoxyalkolols thus obtainable may be prepared in known manner by reaction of the alkoxyalkylols with phosphoric acid.

The great selectivity of the trialkoxyalkyl phosphates as a solvent for acetylene is illustrated by the data of the following table. These data show the relative solubilities at various temperatures of acetylene and ethylene in the trialkoxy phosphates of this invention and in a conventional solvent, acetone.

It is preferred, however, for the reason that much greater quantities of acetylene per unit volume of solvent may thereby be recovered, that the alkoxyalkyl phosphates be utilized at a temperature not greater than about 25° C. A highly desirable range of operating temperatures is from about 20° C. to about 40° C.

The trialkoxyalkyl phosphates of this invention may be utilized in any of the conventional methods of solvent extraction to which acetylene containing gases may be subjected.

Thus the acetylene containing gaseous mixture may merely be brought in contact with the alkoxyalkyl phosphates per se. Likewise, if desired an aqueous solution of an alkoxyalkyl phosphate may be utilized as the extraction medium.

In any event, the acetylene must be stripped from the alkoxyalkyl phosphate solvent medium. This may be effected, for example, by subjecting the acetylene containing solvent to a significant drop in pressure, thereby effecting volatilization of the acetylene.

When the alkoxyalkyl phosphates are utilized in the form of a water solution, the acetylene may be recovered by evaporating acetylene and steam therefrom to form a second gaseous mixture, and removing the steam from said second gaseous mixture by condensation.

All of the trialkoxyalkyl phosphates enumerated above possess the aforementioned desirable properties. Furthermore these compounds are characterized by high molecular weights and hence by high boiling points and low vapor pressures. The alkoxyalkyl phosphates are thermally stable, and although miscible in water in all proportions, do not hydrolyze appreciably. The trialkoxyalkyl phosphates are further advantageous in that they are non-inflammable and do therefore obviate a series hazard which normally attends in solvent absorption processes.

TABLE

*Solubility in volumes per volume of solvent*

| Trialkoxy Phosphate | Acetylene | | | Ethylene | | | Selectivity Index [1] | | |
|---|---|---|---|---|---|---|---|---|---|
| | 0° C. | 25° C. | 38° C. | 0° C. | 25° C. | 38° C. | 0° C. | 25° C. | 38° C. |
| Methoxy ethyl | 33.0 | 15.4 | 10.7 | 2.24 | 1.25 | 1.08 | 14.8 | 12.2 | 10.0 |
| Ethoxy ethyl | 28.1 | 12.8 | 8.66 | 2.82 | 1.61 | 1.29 | 10.0 | 8.0 | 6.8 |
| Methoxy propyl | 28.2 | 12.5 | 7.5 | 2.85 | 1.69 | 1.32 | 10.0 | 1.70 | 5.7 |
| Propoxy ethyl | 25.3 | 10.8 | 7.1 | 3.25 | 1.75 | | 7.7 | 6.2 | |
| Ethoxy propyl | 25.4 | 10.6 | 6.8 | 3.30 | 1.85 | | 7.2 | 5.9 | |
| Butoxy ethyl | 22.1 | | | 3.7 | | | 6.0 | | |
| Acetone | 38.6 | | 16.2 | 4.84 | | 3.1 | 8.0 | | 5.2 |

[1] Selectivity Index = ratio of the number of volumes of acetylene dissolved to the number of volumes of ethylene dissolved.

It is apparent from the foregoing table that the alkoxyalkyl phosphates of the present invention are far superior as compared with acetone, as selective solvents for acetylene. This same superiority is demonstrated by those alkoxyalkyl phosphates embraced by this invention but not represented in the foregoing table. Particularly noteworthy is the fact that trimethoxyethyl phosphate, for example, demonstrates a selective solubility for acetylene approximately twice that of acetone.

It is also of significance that, although the solubility of the various gases in the alkoxyalkyl phosphates of this invention is necessarily decreased by an increase in temperature, the unique selectivity of alkoxyalkyl phosphates for acetylene is not thereby appreciably impaired.

While the trialkoxyalkyl phosphates of the present invention may be employed to advantage as absorbents in a system operated to extract acetylene from a mixture of gases containing it, they may also be used to dissolve acetylene in storage cylinders or for other like uses without departing from the spirit of the invention. For purposes of illustration, however, the present invention will be described, in connection with the use of the trialkoxyethyl phosphates in a system in which acetylene is extracted from a hydrocarbon gas containing acetylene in admixture with other hydrocarbon gases, including ethylene, methane, hydrogen, carbon monoxide, carbon dioxide, etc.

Example 1

A cracked gas of approximately the following composition:

| | Per cent |
|---|---|
| $CO_2$ | 0.4 |
| $C_2H_2$ | 14.8 |
| $C_2H_4$ | 15.7 |
| $H_2$ | 44.0 |
| $CO$ | 2.7 |
| $CH_4$ | 21.0 |
| $O_2$ and $N_2$ | 1.4 | at a superatmospheric pressure of approximately 300 pounds per square inch is brought into contact with an aqueous solution of trimethoxyethyl phosphate containing from 1% to 5% water in a countercurrent absorption tower of conventional type. The aqueous solution and gas mixture are maintained in contact with each other for a sufficient time to allow substantially all of the acetylene in the gas to be absorbed in the aqueous solution which is then collected as a liquid, acetylene-laden absorbent in the bottom of the tower. The residual gases from which the acetylene has been selectively separated are withdrawn from the top of the tower and collected as desired. The liquid, acetylene-laden absorbent is withdrawn from the bottom of the tower and passed through a pressure reducing valve to a stripping column where the major portion of the absorbed acetylene is released from the absorbent by the drop in pressure from approximately 300 pounds per square inch to substantially atmospheric pressure. The remainder of the absorbed acetylene is removed from the absorbent by further reducing the pressure in the stripping tower whereby some of the water contained in the absorbent vaporizes and thus flushes the residual acetylene out of the absorbent. All of the foregoing steps are carried out without an appreciable change in temperature of the absorbent.

The water vapor and acetylene flushed from the absorbent can be removed from the top of the stripping tower and the stripped absorbent, being substantially entirely trimethoxyethyl phosphate, is withdrawn from the bottom of the stripping tower. The trimethoxyethyl phosphate may then be recycled to a point where from 1% to 5% water is added and the aqueous absorbent medium is brought into contact with a new charge of gas from which acetylene is to be removed under the conditions mentioned above. In accordance with the foregoing example a concentrated gas of the following composition, in addition to the water vapor, is obtained from the top of the stripping tower:

| | Per cent |
|---|---|
| $C_2H_2$ | 87.1 |
| $C_2H_4$ | 7.0 |
| $H_2$ | 2.9 |
| $CO$ | 0.6 |
| $CH_4$ | 2.4 |

If an acetylene of higher purity is desired, a second stage of absorption, similar to that described above, may be employed to produce an acetylene of better than 99% purity.

Example 2

A cracked gas of the composition described in Example 1 is treated in the same manner as described in that example except that the triethoxyethyl phosphate solvent is not in aqueous solution. Comparable yields and selectivity are obtained.

In the foregoing examples, it will be understood that any other of the trialkoxyalkyl phosphates useful in the invention can be employed in lieu of trimethoxyethyl or trioxyethyl phosphate as the absorbent.

Example 3

Example 1 is repeated exactly with the exception that tripropoxyethyl phosphate is utilized as a solvent rather than trimethoxyethyl phosphate.

Acetylene of about 86% purity is obtained.

Example 4

Example 2 is repeated with the exception that triethoxypropyl phosphate is utilized as a solvent.

Acetylene of about 85% purity is obtained.

The foregoing specification is given by way of exemplification of the invention and not in limitation thereof, the scope of the invention being that of the subjoined claims.

Reference is made to my co-pending U. S. Patent application, Serial No. 633,841, filed December 8, 1945, now abandoned, which pertains to subject matter in this same field of art.

What I claim is:

1. In a selective absorption process for the recovery of acetylene from a mixture of gases obtained by pyrolysis of hydrocarbons, said mixture including ethylene, methane, hydrogen, carbon monoxide and carbon dioxide in addition to acetylene, the improvement comprising the steps of (1) countercurrently contacting the mixture under a superatmospheric pressure of the order of about 300 pounds per square inch and at a temperature below about 25° C. with a solution comprising 1-5% water and 99-95% of a highly selective, non-inflammable, thermally stable, substantially non-hydrolyzing, high boiling, high molecular weight tri-ester of ortho phosphoric acid which is miscible with water in all proportions, has a low vapor pressure and has the structural formula $(R_1-O-R_2)_3PO_4$ wherein $R_1$ and $R_2$ are alkyl groups and wherein the total number of carbon atoms in $R_1$ and $R_2$ is not greater than six, (2) subsequently evaporating from said solution a mixture of acetylene and steam, and (3) finally separating gaseous acetylene from the acetylene-steam mixture by condensation of the steam.

2. The process of claim 1 wherein the tri-ester is trimethoxyethyl phosphate.

3. The process of claim 1 wherein the tri-ester is triethoxyethyl phosphate.

RUDOLPH LEONARD HASCHE.

References Cited in the file of this patent

UNITED STATES PATENTS

| Number | Name | Date |
|---|---|---|
| 2,371,908 | Morris et al. | Mar. 20, 1945 |
| 2,431,676 | Bour | Dec. 2, 1947 |
| 2,434,796 | Hachmuth | Jan. 20, 1948 |
| 2,580,622 | Vogt et al. | Jan. 1, 1952 |

FOREIGN PATENTS

| Number | Country | Date |
|---|---|---|
| 466,910 | Great Britain | June 8, 1937 |